United States Patent
Braat

[19]

[11] Patent Number: 5,844,870
[45] Date of Patent: Dec. 1, 1998

[54] DEVICE FOR SCANNING AN OPTICALLY READABLE RECORD CARRIER

[75] Inventor: Josephus J. M. Braat, Eindhoven, Netherlands

[73] Assignee: U.S. Philips Corporation, New York, N.Y.

[21] Appl. No.: 764,193

[22] Filed: Dec. 13, 1996

[30] Foreign Application Priority Data

Dec. 27, 1995 [EP] European Pat. Off. .............. 95203644

[51] Int. Cl.[6] .................................................. G11B 7/00
[52] U.S. Cl. ........................ 369/44.41; 369/110; 369/112
[58] Field of Search .................................. 369/112, 110, 369/109, 44.32, 44.34, 44.35, 44.12, 44.41, 44.42

[56] References Cited

U.S. PATENT DOCUMENTS

| | | |
|---|---|---|
| 3,876,841 | 4/1975 | Kramer et al. ................... 179/100.3 V |
| 4,006,293 | 2/1977 | Bouwhuis et al. ...................... 358/128 |
| 4,358,200 | 11/1982 | Heemskerk et al. ..................... 356/123 |
| 4,567,362 | 1/1986 | Kunz ....................................... 250/201 |
| 4,665,310 | 5/1987 | Heemskerk ............................. 250/201 |
| 4,933,924 | 6/1990 | Yonekubo ............................ 369/44.11 |
| 5,436,876 | 7/1995 | Yokoyama et al. .................. 369/44.41 |
| 5,572,495 | 11/1996 | Yamazaki et al. ................... 369/44.35 |
| 5,610,883 | 3/1997 | Yanagawa ............................ 369/44.35 |
| 5,642,340 | 6/1997 | Nomura ............................... 369/44.29 |

*Primary Examiner*—Nabil Hindi
*Attorney, Agent, or Firm*—Michael E. Belk

[57] ABSTRACT

A device for optically scanning an information layer by means of a focused radiation beam. Radiation reflected from the information layer is made astigmatic by an oblique plane parallel plate and subsequently detected by a detection system. An electronic circuit derives a focus error signal, representing the distance between the focal point of the radiation beam and the information plane, from the electrical detector signals by using the high-frequency components in the detector signals. The influence of stray light falling on the detection system on the focus error signal is thereby reduced.

17 Claims, 5 Drawing Sheets

DEVICE FOR SCANNING AN OPTICALLY READABLE RECORD CARRIER

BACKGROUND OF THE INVENTION

The invention relates to a first device for optically scanning an information layer on which information is stored, which device comprises a radiation source, an objective system for converging radiation emitted by the radiation source on the information layer, a beam splitter for forming a sub-beam from substantially one half of a cross-section of a radiation beam from the information layer, a radiation-sensitive detection system comprising two detectors arranged in the sub-beam and providing two detector signals, and a first electronic circuit for forming a first focus error signal from the detector signals by subtracting the two detector signals. The focus error signal in this device is generated by the so-called Foucault method.

The invention also relates to a second device for optically scanning an information layer on which information is stored, which device comprises a radiation source, an objective system for converging radiation emitted by the radiation source on the information layer, a radiation-sensitive detection system arranged in the path of a radiation beam from the information layer, astigmatizing means arranged in the radiation beam between the information layer and the detection system, the detection system comprising four detectors arranged in four separate quadrants, each detector providing a detector signal, and a first electronic circuit for forming a first focus error signal from the detector signals by adding the detector signals of diagonally arranged detectors and subtracting the resulting two differences. The focus error signal generated by this so-called astigmatic method may be used in a focus servo loop which controls the position of the objective system along its optical axis in order to keep a scanning spot formed by the converging beam in the information layer.

The invention also relates to a third device for optically scanning an information layer on which information is stored, which device comprises a radiation source, an objective system for converging radiation emitted by the radiation source on the information layer, a beam splitter for forming two sub-beams from a radiation beam from the information layer, a radiation-sensitive detection system comprising two detection sub-systems, each detection sub-system being arranged in a sub-beam and providing detector signals, and a first electronic circuit for forming a first focus error signal from the detector signals by subtracting two signals derived from the detector signals and each signal representing the diameter of one of the sub-beams. The focus error in this device is generated by the so-called beam-size method.

A device of the first type which can be used, inter alia, in apparatuses for writing and reading information in the tracks of optical record carriers and is known from U.S. Pat. No. 4,665,310. A device of the second type is known from U.S. Pat. No. 4,358,200, and a device of the third type is known from U.S. Pat. No. 4,567,362. A disadvantage of the known devices is that the focus error signal formed by the known electronic circuits is impaired by DC-offsets due to stray light.

SUMMARY OF THE INVENTION

It is an object of the invention to provide an optical scanning device which forms a focus error signal which is not impaired by DC-offsets.

To this end the optical scanning device of the first, second and third type according to the invention are characterized in that the first electronic circuit comprises at least one high-pass filter for filtering at least one of the detector signals such that high-frequency components of the detector signals are used to form the first focus error signal. It turns out that the focus error signal may be derived from high-frequency components of the detector signals of the known detector configurations. Since the DC-offsets do not pass the high-pass filter, the resulting focus error signal is free from DC-offsets. Such a focus error signal is very suitable for use in a scanning device requiring a high-accuracy focusing the radiation on the information layer. The use of a focus error signal derived from high-frequency components is especially advantageous in a scanning device for multi-layer record carriers. Radiation falling on the detection system and coming from information layers presently not being scanned causes a relatively high background illumination of the detection system and an ensuing high DC offset. Since the distance between information layers is several times the focal depth of the objective system, the background illumination will comprise hardly any high-frequency information of these information layers. Thus, the focus error signal according to the invention will hardly be affected by this background.

It is remarked that a scanning device using high-frequency components for deriving a focus error signal is known from U.S. Pat. No. 4,006,293. However, the known device does not use the astigmatic, Foucault or beam-size method to generate the focus error signal.

In a preferred embodiment of the device according to the invention, the first electronic circuit is operative for forming an information signal representing the information stored in the information layer, and the pass band of the high-pass filter is substantially equal to the frequency band of the information signal. The information signal is formed amplifying and adding the high-frequency (HF) components of the detector signals. Since the focus error signal in this embodiment is also formed from the same HF components in the detector signals, several parts of the circuits such as amplifiers and adding circuits may be used for both forming the information signal and the focus error signal.

The capture range of a focus servo loop using the first focus error signal is relatively small. When a device requires a larger capture range, the first electronic circuit may preferably be arranged to form also a second focus error signal from low-frequency components of the detector signals. Depending on the type of operation to be performed by the device, a choice can be made between using the first or the second focus error signal in the focus servo loop.

To avoid transients when switching from one focus error signal to the other, the device is preferably provided with a second electronic circuit connected to the first electronic circuit for receiving the first focus error signal and the second focus error signal, which second electronic circuit forms a combined focus error signal, the weight of the first focus error signal and the second focus error signal in the combined focus error signal being determined by the magnitude of the information signal. The for instance linear combination with changing weights allows a smooth transition between the use of the first and second focus error signal.

BRIEF DESCRIPTION OF THE DRAWINGS

These and other aspects of the invention will be apparent from and elucidated with reference to the embodiments described hereinafter, in conjunction with the following drawings, in which.

(Identical reference numerals in the different Figures denote identical elements.)

DESCRIPTION OF THE PREFERRED EMBODIMENTS

Figure 1:
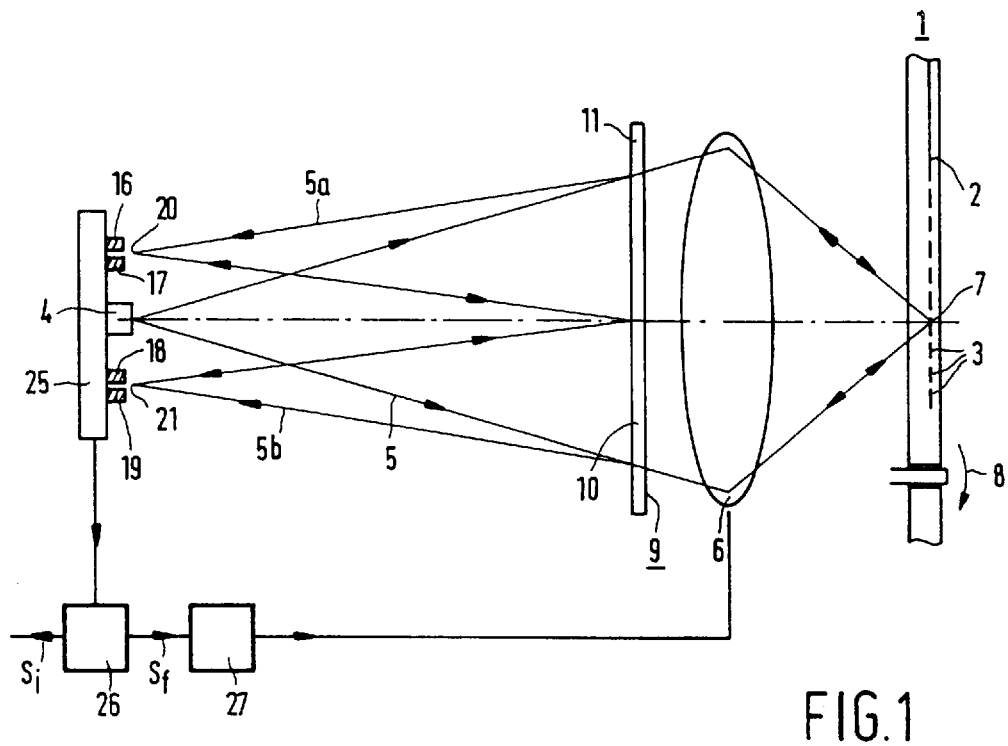
FIG. 1 shows a first scanning device according to the invention.

FIG. 1 shows a first device according to the invention for optically scanning an information layer. The Figure shows a radial cross-section of a small part of an optical record carrier 1 having a radiation reflecting information layer 2. The tracks 3 situated in the information layer extend perpendicular to the plane of the drawing of FIG. 1. The information is stored in optically readable marks arranged in the form of the tracks. the information layer is scanned by a radiation beam 5 emitted by a radiation source 4, for example a diode laser. This beam is focused by an objective system 6. schematically represented by a single lens, to form a small focal spot 7 on the information layer. As the record carrier is rotated about an axis 8, a track 3 is scanned by the focal spot and the radiation reflected from the information layer is modulated by the information contained in this track. By moving the record carrier and the scanning unit, comprising the source 4 and the objective system 6, in a radial direction relative to one another, the entire information layer may be scanned.

Figure 2:
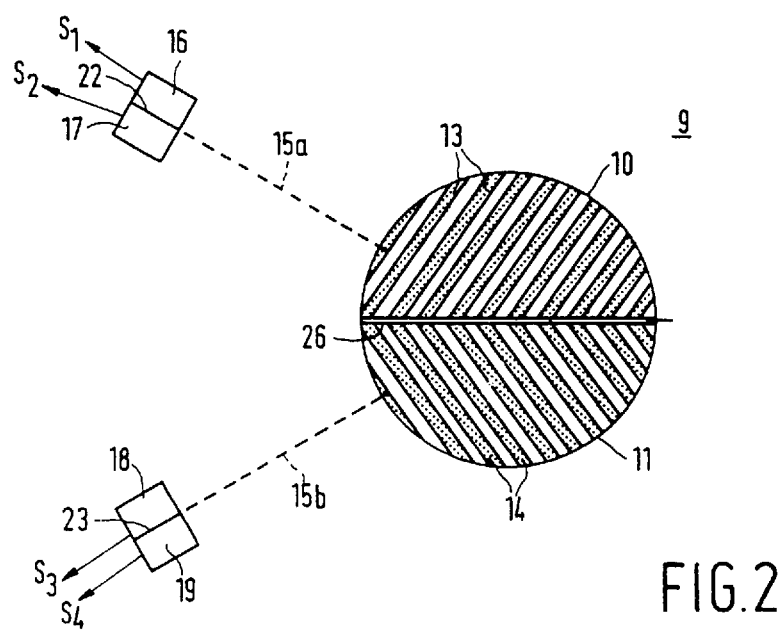
FIG. 2 shows the orientation of the detectors in the device of FIG. 1.

The radiation reflected from the information layer is separated from the radiation beam S by means of a beam-separating element, which may have the form of a grating 9 as shown in FIG. 1 or a prism. The grating 9 comprises two sub-gratings 10 and 11, each occupying about half of the cross-section of the reflected radiation at the position of the grating. Sub-gratings 10 and 11 have about the same grating period but their grating lines 13 and 14 respectively extend at opposite angles to the bounding line 26 between the sub-gratings 10 and 11. In FIG. 2 this grating is shown in front view. Because of the different orientation of the grating lines 13 and 14 the sub-beams 5a and 5b in FIG. 1 are diffracted in different directions. In FIG. 2 these directions are represented schematically by the broken lines 15a and 15b.

In the path of the sub-beams 5a and 5b two radiation-sensitive detection systems, each comprising two detectors 16, 17 and 18, 19 respectively, are arranged in such a way that in the case of a correct focusing of the beam 5 on the information layer 2 the radiation spots 20 and 21 formed by the sub-beams 5a and 5b are situated symmetrically relative to the detectors 16, 17 and 18, 19 respectively and are situated on bounding line 22 between detectors 16 and 17 and on bounding line 23 between the detectors 18 and 19. The detector pairs 16, 17 and 18, 19 may be arranged close to one another, so that these four detector can be integrated on a single substrate 25, preferably together with the radiation source 4. The detectors 16, 17, 18 and 19 provide detector signals $S_1$, $S_2$, $S_3$, and $S_4$ respectively. These signals are applied to a first electronic circuit 26, as schematically indicated by a single line connecting elements 25 and 26 in FIG. 1. The first electronic circuit forms from the detector signals an information signal $S_i$ representing information stored in the tracks of the information layer. the circuit also forms one or more focus error signals $S_f$, representing the distance between the focal point 7 and the plane of the information layer 2 measured along the optical axis of the objective lens 6. The focus error signals are applied to a second electronic circuit 27, which, among others, comprises circuits forming a focus servo loop. The output signal of the second electronic circuit 27 is fed to a focus actuator, which may be a linear motor for moving the objective lens 6 along the optical axis.

Figure 3:
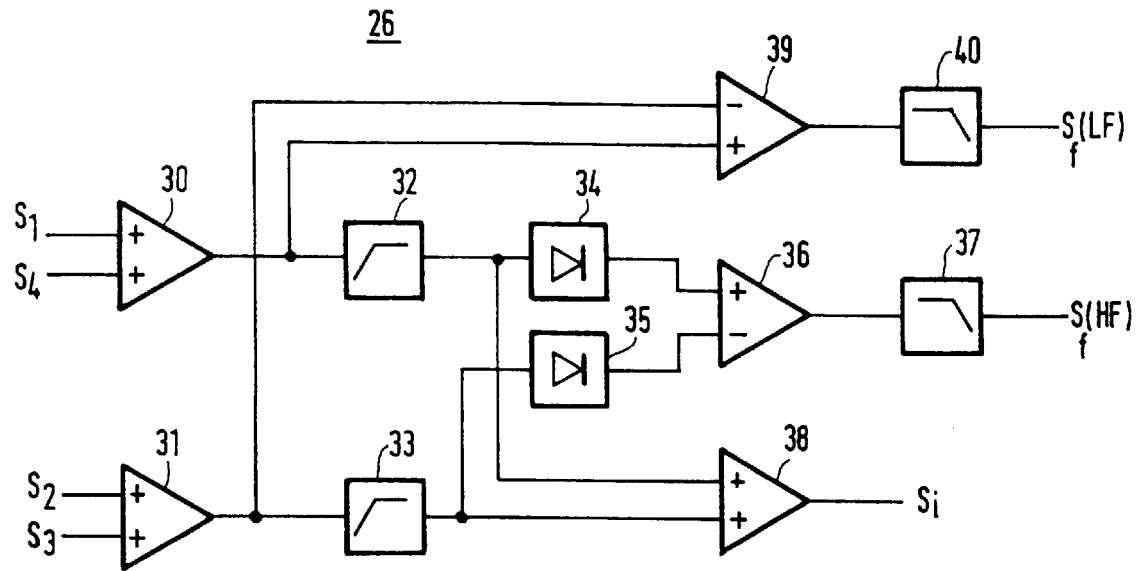
FIG. 3 shows a first electronic circuit for forming a focus error signal.

FIG. 3 shows a schematic lay-out of the first electronic circuit. An adder 30 adds the signals $S_1$ and $S_4$ of the outermost detectors 16 and 19 respectively, whereas an adder 31 adds the signals $S_2$ and $S_3$ of the innermost detectors 17 and 18 respectively. The output signals of the adders 30 and 31 are high-pass filtered in filters 32 and 33 respectively. The cut-off frequency of both filters is preferably below the frequency band of the information signal $S_i$, which frequency band may be from about one to several megahertz. The cut-off frequency is preferably higher than a few tens of kilohertz, above the frequency band containing disturbances. The high-pass filters remove any DC content from the detector signals. The output signals of the filters 32 and 33 are applied to detectors 34 and 35. The detectors may determine the average power or peak power of the high-frequency signal at their inputs. The output signals of the detectors are fed to a subtractor 36 for forming the difference signal from the two input signals. The difference signal is low-pass filtered in filter 37. The cut-off frequency of the filter is preferably just above the bandwidth of the focus servo loop, which in general will be in the range from about a few kilohertz to about ten kilohertz. The filter 37 passes DC-components. The output signal of the filter 37 is the high-frequency derived focus error signal $S_f(HF)$.

The outputs of the high-pass filters 32 and 33 may be combined in an adder 38, thereby forming the high-frequency sum signal from the four detector signals, which is the information signal $S_i$ representing the information stored in the information layer.

The outputs of the adders 30 and 31 may be combined in a subtractor 39 and subsequently low-pass filtered by a filter 40. The filter 40 passes DC components. The characteristics of the filters 37 and 40 may be similar. Since the input of the subtractor 39 is taken out of the signal paths before the high-pass filters 32 and 33, the output of the filter 40 will be influenced by DC content present in the detection signals $S_1$ to $S_4$. The output signal of the filter 40 is the low-frequency focus error signal $S_f(LF)$.

The embodiment of the second electronic circuit shown in FIG. 3 requires a relatively small number of components for forming three different signals from the detection signals. The high-frequency signals may also be used to form a radial tracking error using a heterodyne method, high-frequency phase measuring method or time-interval measurement method.

Other configurations of the second electronic circuit 26 are possible. The circuit may be further simplified if for instance the signals $S_i$ and or $S_f(LF)$ are not needed or are formed in a different circuit. When $S_f(LF)$ is not needed, the subtractor 39 and the filter 40 are not necessary. In that case the high-pass filters 32 and 33 may also be arranged before the inputs of the adders 30 and 31, for instance in the form of a coupling capacitor between a detector and the pertaining adder input. When both $S_f(HF)$ and $S_f(LF)$ are needed, the adders 30 and 31 must be DC-coupled high-frequency adders. However, the adder 30 and 31 may be replaced by a low-frequency DC-coupled adder providing the input signal for the subtractor 39 and a high-frequency AC-coupled adder providing the input signal for the filters 32 and 33. In that case the high-frequency AC-coupled adders may be integrated with the filters 32 and 33. The low-pass filter 37 may form part of the focus actuator, for instance by using the inductance of a motor in the actuator. The low-pass filters 37 and 40 may be integrated with the subtractors 36 and 39, respectively. The filter 37 may be replaced by two low-pass filters, one of them arranged between the detector 34 and the subtractor 36 and the other one between the detector 35 and the subtractor 36. Likewise, the filter 40 may be replaced by two low-pass filters arranged before the inputs of the subtractor 39. When the low-pass filters 37 and 40 are arranged before the subtractors 36 and 39 respectively, the subtractors may be relatively cheap low-frequency subtractors. The detectors 34 and 35 may be combined in a single detector arranged after the subtractor 36. In that case the subtractor must operate in the high-frequency band, whereas in the configuration shown in FIG. 3, the subtractor need only operate in the low-frequency bandwidth of the focus servo loop.

In the above described embodiments of the first electronic circuit 26 the focus error signal is formed by the so-called double-Foucault method. A similar circuit may be used to form the focus error signal by the so-called single-Foucault method in which only one pair of detectors is used. When using detector pair 16, 17, the detector signals $S_1$ and $S_2$ replace the output signal of adders 30 and 31 respectively, whereby the adders themselves are not necessary.

Alternatively it is possible not to derive both the HF- and LF-derived focus error signals from the same one or two pairs of detectors, but to derive the HF-derived focus error signal from one pair of detectors and the LF-derived focus error signal from the other pair of detectors. When e.g. detectors 16 and 17 are used for generating the HF-derived focus error signal, the detector signals $S_1$ and $S_2$ must be fed to filters 32 and 33 respectively, whereas the detector signals $S_3$ and $S_4$ of the pair of detectors 18, 19 must be applied to the subtractor 39. It will be clear that in such an alternative embodiment the LF-derived focus error signal may be formed by any known method, such as the slanting beam method known from U.S. Pat. No. 3,876,841.

Figure 4:
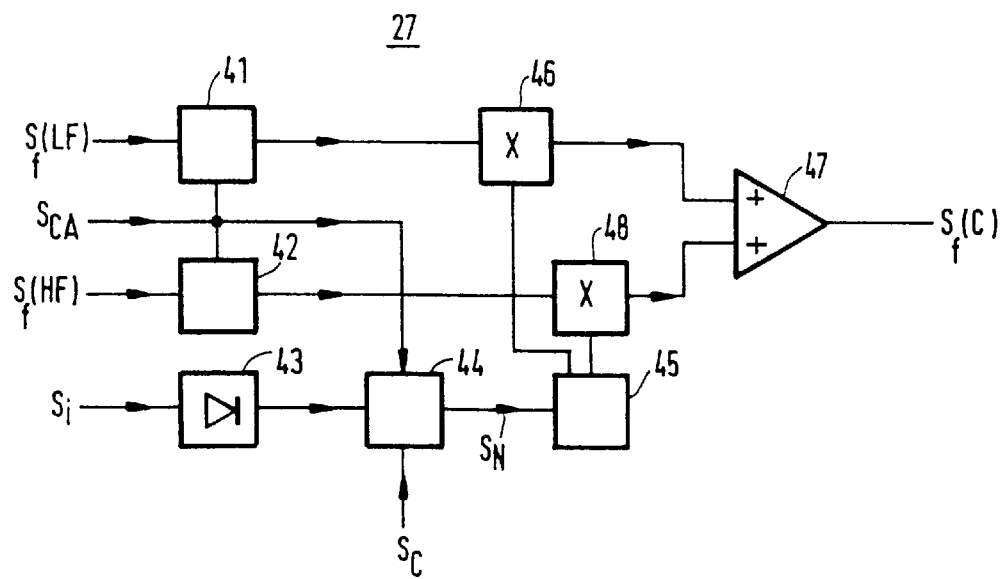
FIG. 4 shows a second electronic circuit for processing focus error signals.
Figure 5A:
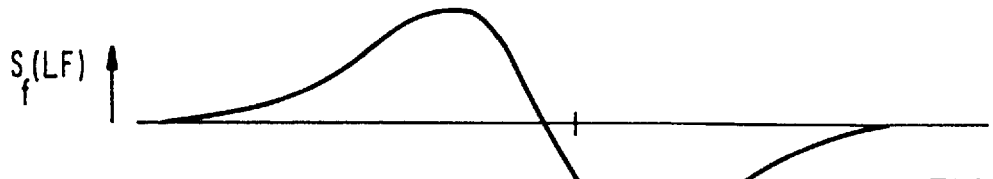
FIG. 5 shows graphically various signals as a function of the focus error.
Figure 5B:
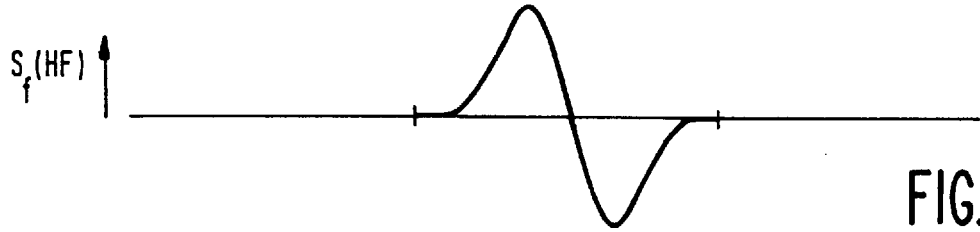
Figure 5C:
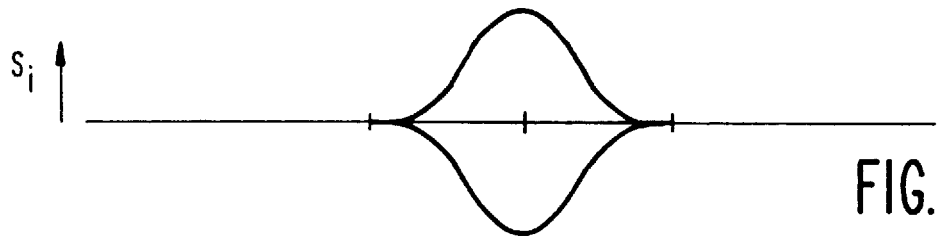
Figure 5D:
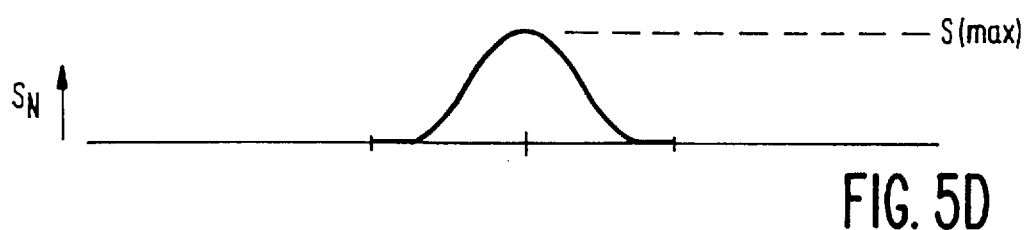
Figure 5E:
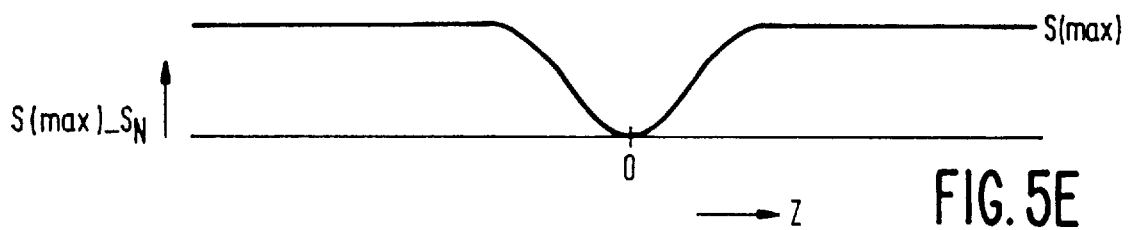

The output signals $S_f(HF)$, $S_f(LF)$ and $S_i$ of the first electronic circuit 26 are applied to the second electronic circuit 27. FIG. 4 shows an embodiment of part of the second electronic circuit 27. The focus error signals $S_f(LF)$ and $S_f(RF)$ are applied to normalizing circuits 41 and 42 respectively. Each normalizing circuit may be in the form of a divider which divides the input signal to the circuit by a so-called central-aperture signal $S_{CA}$, which represents the total amount of radiation incident on the four detectors 16, 17, 18 and 19. The signal $S_{CA}$ may be formed by adding the two output signals of the adders 30 and 31 in FIG. 3. The information signal $S_i$ is rectified in a detector 43, which has as output signal the average power, the peak-power in the signal or the maximum amplitude of the information signal. The output signal is subsequently normalized in a normalizing circuit 44, which has as output a signal having an amplitude between zero and a maximum value, zero representing the absence of information in $S_i$ and the maximum value indicating the correct focusing of the radiation beam 5 on an information containing track in the information layer 2. To make the maximum value independent of the reflectivity of the information layer 2 and of the type of marks in which the information is coded, the normalizing circuit 44 may have two control inputs, one for the signal $S_{CA}$ and one for a signal $S_C$. The signal $S_{CA}$ can correct the output signal of the detector 43 for changes in the amount of radiation reflected from the record carrier 1. The signal $S_C$ is a calibration signal which is calibrated once when starting to scan a record carrier by monitoring the amplitude of the rectified information signal when moving the focal spot along the optical axis through the plane of the information layer 2. The signal $S_{CA}$ is a measure for the reflectivity of the record carrier. When the reflectivity is relatively constant over the surface of the information layer, the normalizing circuit 44 might dispense with the signal $S_{CA}$. The normalized output signal $S_N$ of the normalizing circuit 44 is applied to a circuit 45 which forms the two output signals $S_N$ and $(S(max)-S_N)$, where $S(max)$ is the maximum value that can be attained by $S_N$.

The output of the normalizing circuit 41 is connected to the input of a multiplier 46. The signal $(S(max)-S_N)$ from circuit 45 is applied to another input of the multiplier. When there is no information present in the information signal $S_N$ will be zero and the multiplier 46 will pass the output signal of normalizing circuit 41 to an input of an adder 47. When the focal point 7 is correctly located on the information layer 2, $S_N$ will have its maximum value $S(max)$, and the output of the normalizing circuit 41 will not be passed to the adder 47.

The output of the normalizing circuit 42 is connected to the input of a multiplier 48. The signal $S_N$ from circuit 45 is applied to another input of the multiplier. When there is no information present in the information signal, $S_N$ will be zero and the multiplier 46 will not pass the output signal of normalizing circuit 42 to an input of the adder 47. When the focal point 7 is correctly located on the information layer 2, $S_N$ will have its maximum value $S(max)$, and the output of the normalizing circuit 42 will be passed to the adder 47. The output of the adder 47 is the combined focus error signal $S_f(C)$ which may be used to control the focus servo loop of the scanning device. The combined focus error signal is a linear combination of the HF-derived focus error signal and the LF-derived focus error signal, with weights determined by the information signal:

$$S_f(C)=(S(\text{max})-S_N)*S_f'(LF)+S_N*S_f'(HF),$$

where the normalization of the focus error signals by circuits 41 and 42 has been indicated by a prime added to $S_f$.

FIG. 5 gives a graphical representation of the values of various signals in FIG. 4 as a function of the focus error, i.e. the distance Z between the focal point 7 and the plane of the information layer 2. Z=0 is the point of correct focusing. The highest graph shows the variation of the LF-derived focus error signal $S_f(LF)$ as a function of the focus error. The function has an S shape characteristic of focus error signals. A focus servo loop controlled by this error signal will guide the focus actuator to the Z position where the S-curve has a zero-crossing. This zero-crossing is next to the position Z=0 because of stray light falling on the detectors 16 to 19. The next graph in FIG. 5 shows the S-curve of the HF-derived focus error signal $S_f(HF)$. The width of the S-curve is much smaller than the width of the S-curve of the LF-derived focus error signal. Moreover, the S-curve has its zero-crossing at Z=0, because the focus error signal $S_f(HF)$ is hardly affected by stray light. The third graph in the Figure shows the positive and negative amplitudes of the high-frequency information signal $S_i$. The width of the information signal in the Z-direction roughly corresponds to the width of the S-curve of $S_f(HF)$. The fourth graph shows the amplitude of the $S_N$, being the normalized of the information signal. Its maximum value is equal to S(max). The last graph shows the amplitude of the signal $(S(max)-S_N)$.

Since the second electronic circuit 27 multiplies the HF- and LF-derived focus error signal by the signal in the last and one but last graph, it will be clear that far from focus ($|z|>>0$) the focus servo loop will be controlled by the LF-derived focus error signal providing a wide capture range, and that close to focus the focus servo loop will be controlled by the HF-derived focus error signal providing a small capture range. At the focus point Z=0 the LF-derived focus error signal has no influence on the servo loop, thereby removing any effect of the stray light on the servo loop. The cross-over from one to the other focus error signal is smooth because of the smooth variation of the switching function $S_N$. This avoids jumps in the control of the focus servo loop, which may cause instabilities in the loop.

When the slopes of the S-curves of the two focus error signals at the zero-crossing are different, the 0-dB frequency of the servo loop transfer function changes when changing the control from one focus error signal to the other. Such changes should be avoided, as they might cause instabilities in the servo loop. Therefore, the normalization of the focus error signals in circuits 41 and 42 should preferably be executed in such a way that, instead of making the maximum amplitudes of the two focus error signals equal, the slope of the two focus error signals at the zero-crossings are made equal.

In a different embodiment of the second electronic circuit 27 the circuit 45 checks whether the signal $S_N$ exceeds a predetermined level. When this occurs, a signal generator produces a gradual change in a signal from a level of zero to a certain amplitude, which signal controls the multiplier 48. The signal generator then also generates a gradual decrease in another signal from a certain level down to a level of zero, which signal controls the multiplier 46. These changes take place in a predetermined time interval, which may be set at a few milliseconds.

From the description of the second electronic circuit 27 it will be clear that the circuit can be used for combining any two focus error signals. Instead of combining an LF-derived and an HF-derived focus error signal, the circuit may also be used for combining two LF-derived focus error signals.

Figure 6:
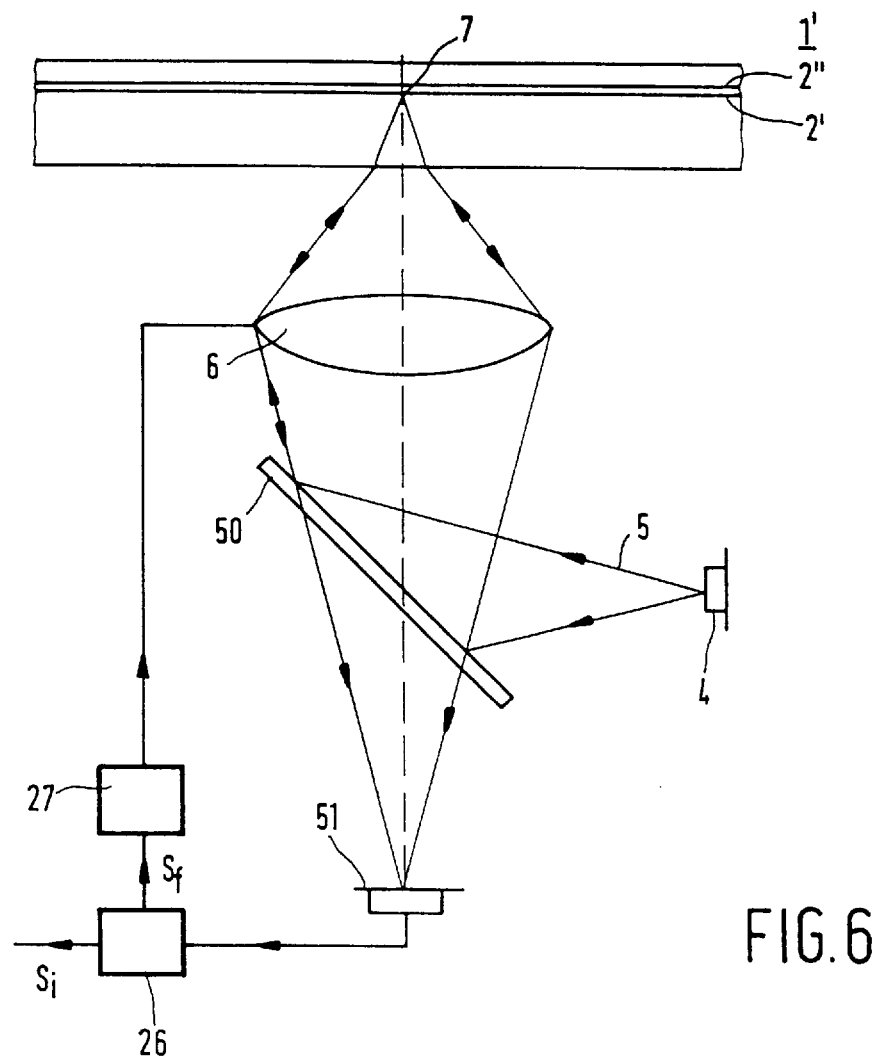
FIG. 6 shows a second scanning device according to the invention.

FIG. 6 shows a second scanning device according to the invention which is compatible for scanning two type of record carrier having different thicknesses of the substrate. A record carrier 1' comprises two information layers 2' and 2", spaced at a relatively small distance, for instance 50 $\mu$m. A radiation beam 5 emitted by a radiation source 4 is reflected by a beam splitter 50, e.g. a semi-transparent plate, and focused by an objective system 6 to a focal point 7 on one of the information layers. The radiation reflected by the information layers is converged by the objective system and partly transmitted by the beam splitter 50 on a detection system 51. The beam splitter has such a thickness that the converging beam transmitted through it acquires a certain amount of astigmatism.

Figure 7:
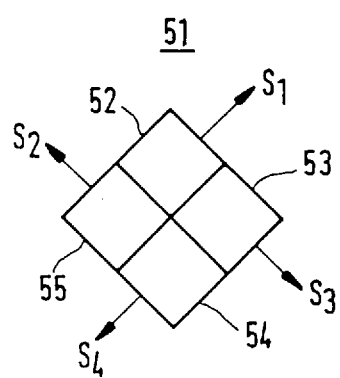
FIG. 7 shows the orientation of the detectors in the device of FIG. 6.

FIG. 7 shows a front view of the detection system 51, comprising four detectors 52, 53, 54 and 55 arranged in the four quadrants of a rectangular coordinate system. The detectors 51, 52, 53 and 54 convert radiation incident on the detectors into detector signals $S_1, S_3, S_4$ and $S_2$ respectively. The four detector signals are applied to the first electronic circuit 26 as shown in FIG. 3, in which circuit an HF-derived focus error signal $S_f(HF)$ is formed from the detector signals. When changing the scanning from one information layer to another, for instance from information layer 2' to 2", the focal point has to make a relatively short jump, i.e. of the order of a few tens of micrometers. For such a short jump the speed of the focus actuator will not be very high, and the relatively short capture range obtained when using the HF-derived focus error signal is sufficient to brake the actuator and bring it to a standstill when in focus. The use of the HF-derived focus error signal when scanning multi-layer optical record carriers is very advantageous, because this focus error signal is far less affected by stray light from presently not read information layers than the LF-derived focus error signal. The stray light from a presently not read information layer forms a relatively large spot of radiation on the detection system, because the not read information layer is out of focus by several focal depths of the objective system. The large spot hardly contains any high-frequency information anymore due to the defocusing. The large spot will therefore have little influence on the HF-derived focus error signal, which can be made to use only the frequency band of the information signal.

When starting to read a record carrier, the focus actuator must often travel over a considerable distance to bring the focal point 7 in coincidence with an information layer 2' or 2". The small capture range of the HF-derived focus error signal may then be too small to adequately brake the actuator when close to focus. In that case the first electronic circuit 26 in the second device preferably also forms an LF-derived focus error signal having a wide capture range for bringing the focal point close to the information layer during start up. When sufficiently close to focus, the second electronic circuit 27 may switch control of the focus servo loop from the LF-derived focus error signal to the HF-derived focus error signal.

Figure 8:
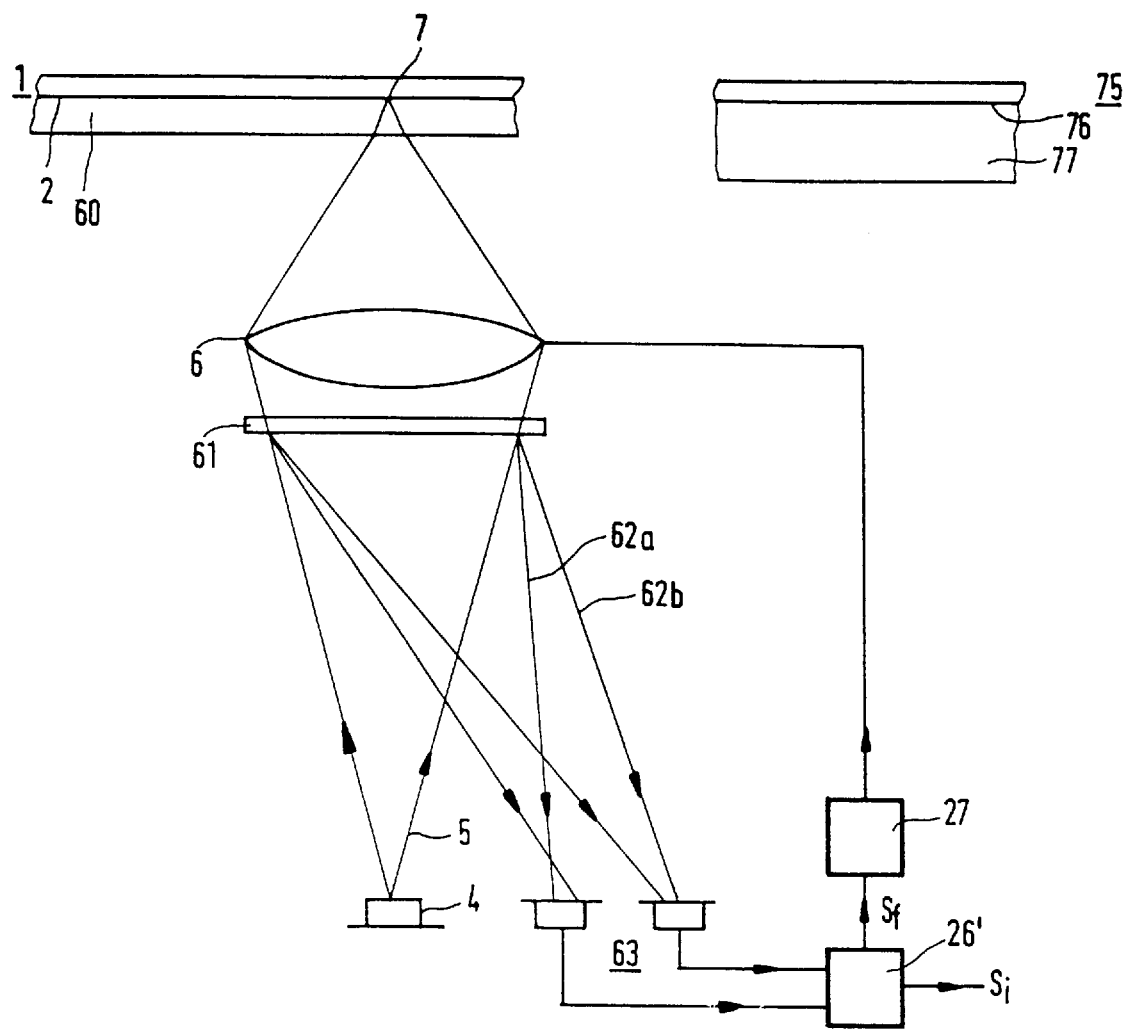
FIG. 8 shows a third scanning device according to the invention.

FIG. 8 shows a third scanning device according to the invention. A record carrier 1 comprises an information layer 2 arranged on a transparent substrate 60 through which the information layer is being scanned. A radiation beam 5 emitted by a radiation source 4 is focused by an objective system 6 to a focal point 7 on the information layer 2. The radiation reflected by the information layers is converged by the objective system and partly diffracted by a beam splitter 61, forming two sub-beams 62a and 62b, which converge towards a detection system 63. The beam splitter 61 may comprise two overlapping gratings, one of which forms the sub-beam 62a, focused just above the radiation-sensitive surface of the detection system 63, the other grating forming the sub-beam 62b, focused just below the radiation-sensitive surface of the detection system 63, in case the focal point 7 is located at the information layer. In another embodiment, the two sub-beams 62a and 62b may be focused in the same plane, whereas the detection system 63 has two detectors arranged at different heights in the two sub-beams.

Figure 9:
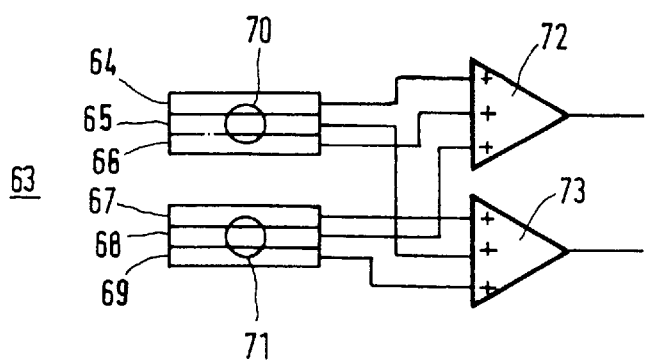
FIG. 9 shows a front view of the detection system in the device of FIG. 7.

FIG. 9 shows a front view of the detection system 63 and two input circuits of a first electronic circuit 26'. The detection system comprises two groups of three parallel, elongate detectors 64, 65, 66 and 67, 68, 69. When the focal point 7 is located in the information layer 2, the sub-beams 62a and 62b form two spots 70 and 71 of equal size on the detection system. The detector signals of detectors 64, 66 and 68 are applied to an adder 72, the detector signals of detectors 65, 67 and 69 are applied to a second adder 73. The adders 72 and 73 of circuit 26' replace the adders 30 and 31 in the circuit 26 as shown in FIG. 3. The other elements of circuits 26 and 26' may be identical. The operation of the circuit 26' and the circuit 27 coupled with it are the same as the operation of the circuit 26 and 27 as described with reference to FIGS. 3 and 4.

The objective system 6 of the third device shown in FIG. 8 is designed to form a proper focal point on the information layer 2 through the substrate 60. This means that the spherical aberration incurred by the radiation beam in the passage through the substrate is compensated by an equal amount of spherical aberration having the opposite sign in the objective system. FIG. 8 also shows a cross-section of a small part of a record carrier 75 of a different type. An information layer 76 is arranged on a substrate 77 having a larger thickness than the substrate 60, for instance 1.2 mm instead of 0.6 mm. The record carrier 75 can be scanned by the optical system comprising the elements 4, 6, 61 and 63, when the focus servo loop is arranged such that the best focus of the radiation beam 5 is located on information layer 2 and the paraxial focus on the information layer 76. In the latter case, the marginal rays of the radiation beam 5 will cause a large spot of stray light on the detection system 63. The large spherical aberration of the marginal rays will reduce the high-frequency content in the stray light. The HF-derived focus error signal $S_f(HF)$, formed from the high-frequency components in the detector signals, will therefore hardly be affected by the stray light. In contrast, the known LF-derived is strongly affected by the stray light, causing a relatively large focus offset. The offset in the LF-derived focus error signal can only be reduced by intercepting the marginal rays when scanning the record carrier 75. The device shown in FIG. 8 does not require intercepting means. When scanning record carrier 1, the LF-derived focus error signal may be used during the start up phase, and close to focus either the LF-derived or the HF-derived focus error signal may be used. Since both paraxial and marginal rays contain high-frequency components when scanning the record carrier 1, the HF-derived focus error signal will be formed from both paraxial and marginal rays, and cause the focal point 7 to settle correctly on the information layer 2. When scanning record carrier 75, the LF-derived focus error signal may again be used during the start up phase because of its wide capture range. Close to focus the HF-derived focus error signal should be used. Since only the paraxial rays contain high-frequency components when scanning the record carrier 75, the HF-derived focus error signal will be formed from the paraxial rays only, and cause the focal point 7 to settle correctly on the information layer 76.

Although the scanning of a multi-layer record carrier is discussed with reference to the device shown in FIG. 7 and the scanning of the record carriers with different substrate thicknesses with reference to the device shown in FIG. 8, the other devices described are equally appropriate for scanning these record carriers and these devices achieve the same advantages.

I claim:

1. A device for optically scanning an information layer on which information is stored, which device comprises:

a radiation source;

an objective system for converging radiation emitted by the radiation source on the information layer;

a beam splitter positioned for forming a sub-beam from substantially one half of a cross-section of a radiation beam from the information layer;

a radiation-sensitive detection system comprising two detectors arranged in the sub-beam and providing two detector signals; and first electronic circuit means for forming a first focus error signal from the detector signals by subtracting the two detector signals, and including:

at least one high-pass filter means for filtering at least one of the detector signals to form the first focus error signal from high-frequency components of the detector signals, with a filter pass frequency for removing the effects of stray light; and means for forming an information signal representing the information stored in the information layer, with a frequency substantially equal to the frequency of the pass band of the high-pass filter means.

2. A device for optically scanning an information layer on which information is stored, which device comprises:

a radiation source;

an objective system for converging radiation emitted by the radiation source on the information layer;

a radiation-sensitive detection system arranged in the path of a radiation beam from the information layer, including four detectors arranged in four separate quadrants, each detector providing a detector signal;

astigmatizing means arranged in the radiation beam between the information layer and the detection system; and first electronic circuit means for forming a first focus error signal from the detector signals by adding the detector signals of diagonally arranged detectors and subtracting the resulting two differences, and including at least one high-pass filter means for filtering at least one of the detector signals to form the first focus error signal from high-frequency components of the detector signals, with a filter pass frequency for removing the effects of stray light; and means for forming an information signal representing the information stored in the information layer, with a frequency substantially equal to the frequency of the pass band of the high-pass filter means.

3. A device for optically scanning an information layer on which information is stored, which device comprises;

a radiation source;

an objective system for converging radiation emitted by the radiation source on the information layer;

a beam splitter positioned for forming two sub-beams from a radiation beam from the information layer;

a radiation-sensitive detection system comprising two detection sub-systems, each detection sub-system being arranged in a sub-beam and providing detector signals; and first electronic circuit means for forming a first focus error signal from the detector signals by subtracting two signals derived from the detector signals and each signal representing the diameter of one of the sub-beams, and including:

at least one high-pass filter means for filtering at least one of the detector signals to form the first focus error signal from high-frequency components of the detector signals, with a filter pass frequency for removing the effects of stray light; and means for forming an information signal representing the information stored in the information layer, with a frequency substantially equal to the frequency of the pass band of the high-pass filter means.

4. The device of claim 1, wherein the electronic circuit means include a high-frequency detector and a low-pass filter arranged in the signal path after the high-pass filter.

5. The device of claim 1, wherein the first electronic circuit means include means to form a second focus error signal from low-frequency components of the detector signals.

6. The device of claim 5, wherein the device further comprises a second electronic circuit means connected to the first electronic circuit means, for receiving the first focus error signal and the second focus error signal and forming a combined focus error signal with the weight of the first focus error signal and the second focus error signal in the combined focus error signal being determined by the magnitude of the information signal.

7. The device of claim 2, wherein the first electronic circuit means include means for forming an information signal representing the information stored in the information layer; and the pass band of the high-pass filter is substantially equal to the frequency band of the information signal.

8. The device of claim 3, wherein:
the first electronic circuit means include means for forming an information signal representing the information stored in the information layer; and
the pass band of the high-pass filter is substantially equal to the frequency band of the information signal.

9. The device of claim 2, wherein the electronic circuit means include a high-frequency detector and a low-pass filter arranged in the signal path after the high-pass filter.

10. The device of claim 3, wherein the electronic circuit means include a high-frequency detector and a low-pass filter arranged in the signal path after the high-pass filter.

11. The device of claim 2, wherein the first electronic circuit means include means to form a second focus error signal from low-frequency components of the detector signals.

12. The device of claim 3, wherein the first electronic circuit means include means to form a second focus error signal from low-frequency components of the detector signals.

13. The device of claim 11, further comprising a second electronic circuit means connected to the first electronic circuit means, for receiving the first focus error signal and the second focus error signal and forming a combined focus error signal with the weight of the first focus error signal and the second focus error signal in the combined focus error signal being determined by the magnitude of the information signal.

14. The device of claim 12, further comprising a second electronic circuit means connected to the first electronic circuit means, for receiving the first focus error signal and the second focus error signal and forming a combined focus error signal with the weight of the first focus error signal and the second focus error signal in the combined focus error signal being determined by the magnitude of the information signal.

15. A device for optically scanning an information layer on which information is stored, which device comprises:
a radiation source;
an objective system for converging radiation emitted by the radiation source on the information layer to form a reflected beam containing the information;
a radiation-sensitive detection system positioned in the reflected beam and including one or more pairs of detectors, each detector providing a respective detector signal; and
first electronic circuit means for forming a first focus error signal from the detector signals by subtracting the detector signals, and including:
at least one high-pass filter means for filtering at least one of the detector signals to form the first focus error signal from high-frequency components of the detector signals, with a filter pass frequency for removing the effects of stray light; and
means for forming an information signal representing the information stored in the information layer, with a frequency substantially equal to the frequency of the pass band of the high-pass filter means.

16. Apparatus for playing and/or recording information on a record carrier with at least tracking information in an information layer, comprising:
a radiation source;
an objective system for converging radiation emitted by the radiation source on the information layer;
a radiation-sensitive detection system including pairs of detectors arranged in the sub-beam and providing detector signals; and
first electronic circuit means for forming a first focus error signal from the detector signals by subtracting the detector signals, and including:
at least one high-pass filter means for filtering at least one of the detector signals to form the first focus error signal from high-frequency components of the detector signals, with a filter pass frequency for removing the effects of stray light; and
means for forming an information signal representing the information stored in the information layer, with a frequency substantially equal to the frequency of the pass band of the high-pass filter means;
servo means for adjusting the relative positions of the objective system and the information carrier;
means for moving the radiation beam with respect to the information carrier for reading and/or recording information on the record carrier.

17. A process for producing pre-recorded computer media, comprising the steps of:
producing emmitted radiation;
converging the emitted radiation onto an information layer using an objective system to produce a reflected beam;
sensing the reflected beam using pairs of detectors arranged in the reflected beam, each detector providing a respective detector signal; and
forming a first focus error signal from the detector signals using the sub-steps of:
subtracting detector signals;
filtering at least one of the detector signals using a high pass filter to form the first focus error signal from high-frequency components of the detector signals, with a filter pass frequency for removing the effects of stray light; and
forming an information signal representing the information stored in the information layer, with a frequency substantially equal to the frequency of the pass band of the high-pass filter means.

* * * * *